Patented Apr. 7, 1931

1,799,882

UNITED STATES PATENT OFFICE

HANS BRENEK, OF PORZ-ON-THE-RHINE, GERMANY, ASSIGNOR TO THE FIRM OF RHENANIA VEREIN CHEMISCHER FABRIKEN A. G., AACHEN, OF AACHEN, GERMANY, A CORPORATION OF GERMANY

PROCESS FOR PRODUCING FERTILIZER

No Drawing. Application filed March 27, 1925, Serial No. 18,915, and in Germany March 21, 1924.

The pyrogeneous decomposition of phosphorites, for instance by heating, at sintering temperature or temperature of fusion, mixtures of these phosphorites with compounds of alkaline earth metals, e. g. carbonate of calcium or caustic lime, alkali metal compounds, e. g. soda, potash, alkali metal silicates and similar substances is known. In these processes, the inventors endeavored to obtain phosphoric acid in combined form, such as exists in Thomas-meal (tetracalcium phosphate). They therefore attached special importance to the presence of compounds of alkaline earth metals. The addition of metal salts was for the purpose of lowering the fusion point. These well known processes, which generally yield products with about 17% of total phosphoric acid, have shown, among other things, the inconvenience that the relatively low point of fusion of the mixtures proposed involves since it results in great technical difficulties in the manufacture.

According to the present invention, alkali metal dicalcium phosphate e. g. $Na_2Ca_2(PO_4)_2$, is produced by heating tricalcium phosphate with silicic acid and alkaline reacting alkali metal salts at temperatures of decomposition, e. g. 1200°. When using soda, the reaction will, for example take place in accordance with the following equation:

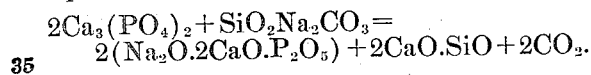

Consequently the reaction mixture must be proportionated to such a degree that the silicic acid takes 1 molecule of CaO from the tricalcium phosphate, while forming orthosilicate, in return for which 1 mol. of alkali metal oxide will pass into the complex of phosphates.

When working up natural phosphorites containing, besides phosphate of tricalcium, also other compounds of calcium, such as $CaCO_3$, $CaF_2$, etc., it was found that compounds of calcium in contradistinction to processes hitherto known, will interfere with the decomposition. In the present invention this disadvantage is avoided by regulating the quantity of silicic acid to such a degree that the lime which is uncombined with phosphoric acid will react with the silicic acid to be combined as $2CaO.SiO_2$.

According to the foregoing explanations, the mixtures to be worked up according to this invention should be composed in such a way that the molecular proportion of silicic acid to the whole of the lime be bound thereto is about 1:2, while the molecular ratio of alkali metal oxide to phosphoric acid anhydride is about 1:1. The silicic acid contained in the phosphate rock must be taken into consideration irrespective of whether it be present in an uncombined or in a combined form.

The silicic acid to be added may be supplied in the form of sand, silicates, etc.

The addition of alkali can be effected for example in the form of alkaline reacting salts such as carbonates or hydroxides such as soda, potash, caustic soda and the like. An excess of alkali oxide is permissible but uneconomical.

The silicic acid required for the decomposition is advantageously introduced into the process in the form of phosphorites abounding in silicic acid. By mixing phosphorites being scantily supplied with silicic acid, but e. g. rich in calcium carbonate, with phosphorites abounding in silicic acid, one will easily succeed in obtaining the suitable proportion of silicic acid to lime. When working up phosphorites rich in iron and argilliferous earths, one should consider, while composing the mixtures, that iron and argillaceous earth are able, owing to the formation of calcium aluminate or calcium ferrite, to serve as substitute for silicic acid.

Examples (1) 100 parts of a raw phosphate of the following composition:

39,70% $P_2O_5$, 47.01% CaO (combined with phosphoric acid), 5,61% CaO (uncombined with phosphoric acid), and 0,56% $SiO_2$, require for 1/3 of the CaO combined with phosphoric acid 8, 43 parts of $SiO_2$, for the lime uncombined with phosphoric acid 3, 02 parts of $SiO_2$; altogether, when deducting the silicic acid already present in the raw phosphate, 10,89 parts of $SiO_2$. For the $P_2O_5$ contained in 100 parts of the phosphorite, 17,32 parts of alkali metal oxide $Na_2O$ is needed.

In conformity with this, 100 parts of raw phosphate, 11 parts of arenaceous quartz, and 32 parts of calcined soda were intimately mixed and heated to the glowing point at about 1200°. This product contains 32,2% of total $P_2O_5$ and 31,4% of $P_2O_5$ being soluble in an ammonical ammonium citrate solution, according to Petermann.

(2) Raw phosphate I contains: 34,20%; 40,49%; 5,16%; 2,06%

Raw phosphate II contains: 32,28% $P_2O_5$; 38,22% CaO (combined with phosphoric acid); 6,21% CaO (uncombined with phosphoric acid); 14,79% $SiO_2$ 100 parts of the raw phosphate I also require 8 parts of $SiO_2$, 100 parts of the raw phosphate II have an excess of 4,5 parts of $SiO_2$.

By mixing 100 parts of raw phosphate I
175 parts of raw phosphate II and
70 parts of calcined soda the required ratio of lime to silicic acid and of alkaline metal oxide to the phosphoric acid anhydride will be obtained. By heating this mixture to the point of glowing at about 1200° there will be formed a product with 30,12% of total phosphoric acid and of 29,3% $P_2O_5$ being soluble in an ammoniacal ammonium citrate solution, according to Petermann.

Wherever, in the foregoing description as well as in the following claims, silicic acid is made mention of, this refers to the whole of the silicic acid present in the process, no matter whether it appears in an uncombined or in a combined form.

I claim:

1. A method for making a fertilizer which consists in heating to temperatures of about 1200° C. in the absence of steam a mixture of raw phosphate, silica and alkali-metal carbonate, said mixture containing about such amounts of $P_2O_5$, CaO, $SiO_2$, and at least such an amount of alkali-metal oxide as would be present in a mixture of $Ca_2Na_2P_2O_5$ and $Ca_2SiO_4$, having the same content of $P_2O_5$ and CaO as the raw phosphate employed.

2. A method for making a fertilizer which consists in heating to temperatures of about 1200° C. in the absence of steam a mixture of raw phosphate, silica and sodium carbonate, said mixture containing about such amounts of $P_2O_5$, CaO, $SiO_2$, and at least such an amount of sodium oxide as would be present in a mixture of $Ca_2Na_2P_2O_5$ and $Ca_2SiO_4$, having the same content of $P_2O_5$ and CaO as the raw phosphate employed.

3. A method for making a fertilizer which consists in heating to temperatures of about 1200° C. in the absence of steam a mixture of a raw phosphate poor in silica, a raw phosphate rich in silica and alkali-metal carbonate, said mixture containing about such amounts of $P_2O_5$, CaO, $SiO_2$ and at least such an amount of alkali-metal oxide as would be present in a mixture of $Ca_2Na_2P_2O_5$ and $Ca_2SiO_4$ having the same content of $P_2O_5$ and CaO as the raw phosphate mixture employed.

4. A method for making a fertilizer which consists in heating to temperatures of about 1200° C. in the absence of steam a mixture of a raw phosphate free from silica, a raw phosphate rich in silica and alkali-metal carbonate, said mixture containing about such amounts of $P_2O_5$, CaO, $SiO_2$ and at least such an amount of alkali-metal oxide as would be present in a mixture of $Ca_2Na_2P_2O_5$ and $Ca_2SiO_4$ having the same content of $P_2O_5$ and CaO as the raw phosphate mixture employed.

In testimony whereof I affix my signature.

HANS BRENEK.